United States Patent
Song

(10) Patent No.: US 7,117,399 B2
(45) Date of Patent: Oct. 3, 2006

(54) METHOD OF AND APPARATUS FOR CONTROLLING DATA STORAGE SYSTEM ACCORDING TO TEMPERATURE, AND MEDIUM

(75) Inventor: Seung-hyun Song, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 430 days.

(21) Appl. No.: 10/463,860

(22) Filed: Jun. 18, 2003

(65) Prior Publication Data

US 2004/0044944 A1    Mar. 4, 2004

(30) Foreign Application Priority Data

Jun. 22, 2002   (KR) .............................. 2002-35143

(51) Int. Cl.
*G06F 11/00* (2006.01)
*G11B 5/09* (2006.01)

(52) U.S. Cl. ........................................ 714/704; 360/53
(58) Field of Classification Search .................... None
See application file for complete search history.

(56) References Cited

U.S. PATENT DOCUMENTS

| | | | |
|---|---|---|---|
| 5,790,334 A | * | 8/1998 | Cunningham ................. 360/66 |
| 6,574,061 B1 | * | 6/2003 | Ling et al. ..................... 360/66 |
| 6,754,035 B1 | * | 6/2004 | Rose et al. .............. 360/78.06 |

FOREIGN PATENT DOCUMENTS

| | | |
|---|---|---|
| JP | 07-085409 | 3/1995 |
| JP | 2001-057010 | 2/2001 |

* cited by examiner

Primary Examiner—Christine T. Tu
(74) *Attorney, Agent, or Firm*—Staas & Halsey LLP

(57) ABSTRACT

A method of and an apparatus for controlling a data storage system according to a temperature which thermally expands a write head pole tip of a write head includes supplying the write head with a predetermined warming current in a low temperature environment, so as to prevent a degradation of a writing characteristic of a signal in an initial writing stage. Therefore, errors due to a degradation of a signal level written in a sector of an initial writing mode do not occur by performing a warming write using the predetermined warming current so that data existing in a storage system before performing a writing mode is not erased, and by sufficiently thermally expanding the write head pole tip of the write head until a saturation state before writing starts.

25 Claims, 7 Drawing Sheets

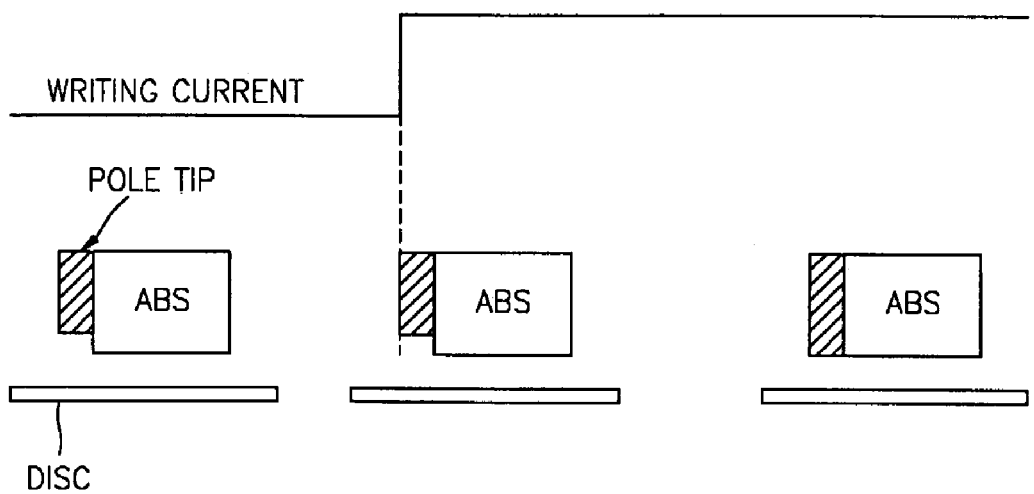
FIG. 1A  FIG. 1B  FIG. 1C
FIG. 2
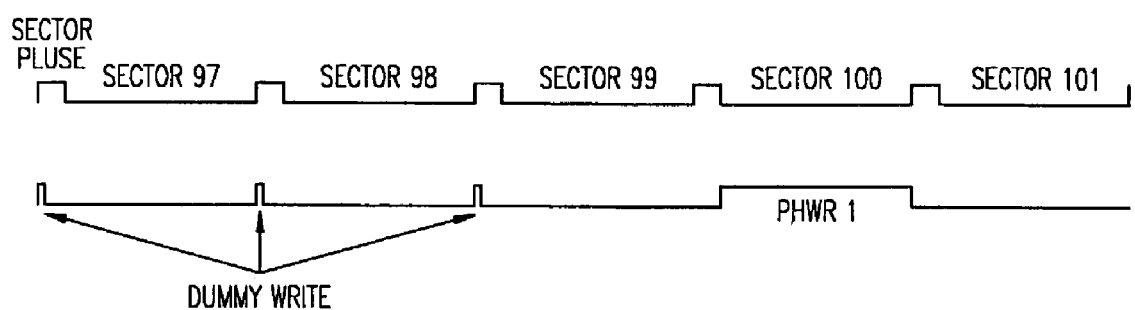

METHOD OF AND APPARATUS FOR CONTROLLING DATA STORAGE SYSTEM ACCORDING TO TEMPERATURE, AND MEDIUM

CROSS-REFERENCE TO RELATED APPLICATIONS

This application claims the priority of Korean Patent Application No. 2002-35143, filed Jun. 22, 2002, in the Korean Intellectual Property Office, the disclosure of which is incorporated herein in its entirety by reference.

BACKGROUND OF THE INVENTION

1. Field of the Invention

The present invention relates to a method of and an apparatus for controlling a data storage system, and a medium, and more particularly, to a method of and an apparatus for controlling a data storage system according to a temperature at which a write head pole tip thermally expands, by supplying the writing head with a predetermined warming current in a low temperature environment, so as to prevent degradation of writing characteristics of a signal on a disk in an initial writing stage, and a medium.

2. Description of the Related Art

A hard disk drive writes data received from a host computer or reads data written on a hard disk using a magnetic head. Nowadays, since hard disks are manufactured to have a large capacity and a small size, the number of bits that can be fit on each track, i.e., BPI (bit per inch), and the number of tracks that can be fit on the disk, i.e., TPI (tracks per inch), increase, and therefore, more sophisticated and rapid method and mechanism for controlling a head position are needed.

Typically, at a low temperature, the hard disk drive shrinks, and a coercive force increases due to its magnetic physical characteristics. As a result, it becomes difficult to write the data on a medium in comparison with a normal or high temperature case.

Further, a pole tip of a writing head thermally expands due to a high temperature inside the hard disk drive. Because of this, in an initial writing stage, the pole tip shrinks at the low temperature and then thermally expands at the high temperature due to a writing current. The pole tip thermally expands until it reaches a saturation state when the writing current is continuously applied to the pole tip for a predetermined time.

The pole tip shrinks at the low temperature as shown in FIG. 1A. If the writing current starts flowing through the writing head by a writing command, the pole tip keeps expanding during the initial writing stage as shown in FIG. 1B. Then, after a temperature of the pole tip has been sufficiently raised due to the writing current applied for the predetermined time, the pole tip thermally expands until the saturation state as shown in FIG. 1C.

Due to the foregoing, a flying height of the writing head from a disk surface of the medium becomes changed. Therefore, the flying height in the initial writing stage increases temporarily until the pole tip thermally expands, and so a level of a signal written in an initial writing sector is reduced when the signal is reproduced. Because of this, repeated errors appear when the data written in a sector of the initial writing sector is reproduced. Especially, at the low temperature, reading errors occur more frequently in the initial writing sector.

To solve the above problem, a conventional dummy write method has been introduced. As shown in FIG. 2, the pole tip of the writing head expands by performing dummy write method in a gap between sectors before the writing head reaches a target sector (for example, a sector 100). However, in the dummy write method performed in the hard disk drive, a number of bytes which are dummy written are changed according to a head position of the writing head with respect the disk surface of the medium. The average number of bytes which are dummy written is about 1.5 track * a number of data sectors * 6 bytes. Then, when the number of bytes which are dummy written is small, according to the head position, initial writing characteristics of the writing head degrade.

Even if the number of bytes which are dummy written is sufficiently large, and then the above problem may be solved, a delay in a writing time still occurs.

SUMMARY OF THE INVENTION

It is an aspect of the present invention to provide a method of and an apparatus for controlling a data storage system according to a temperature, in order to perform a writing mode after thermally expanding a pole tip of a writing head until a saturation state, by continuously applying a warming current before starting the writing mode, to the extent that previously written data is not erased.

Additional aspects and advantages of the invention will be set forth in part in the description which follows and, in part, will be obvious from the description, or may be learned by practice of the invention.

Accordingly, to achieve the above and/or other aspects, there is a method of controlling a data storage system having a medium, wherein the method includes detecting a temperature of the data storage system to determine whether the detected temperature is below a critical temperature, upon determining that the detected temperature is below the critical temperature, determining whether a read and/or write current is enabled, and enabling a predetermined warming write current while the read and/or write current is not enabled, to be applied to a write head of the data storage system.

The method includes setting a value of the predetermined warming write current. The setting of the value of the predetermined warming write current includes (a) measuring a first bit error rate in a predetermined test zone of the medium, (b) rotating the the medium a predetermined number of times while varying the value of the predetermined warming write current applied to the write head, (c) measuring a second bit error rate from the predetermined test zone according to the value of the warming write current, (d) calculating a difference between the first bit error rate according to the value of the warming current measured in operation (c) and the second bit error rate measured in operation (a), and (e) comparing the difference calculated in operation (d) with a predetermined critical value to determine the value of the warming current when the difference is below the predetermined critical value, as a warming write current.

To achieve the above and/or other aspects, an apparatus for controlling a data storage system includes a temperature sensor which senses a temperature of the data storage system, a controller which enables a predetermined warming write current if the temperature sensed by the temperature sensor is below a predetermined critical temperature, and a write driver which supplies a writing head with the predetermined warming write current.

According to another aspect of the present invention, an apparatus for controlling a data storage system having a write head includes a controller measuring a first bit error rate in a predetermined test zone of a medium, measuring a second bit error rate according to a current supplied to the write head in the predetermined test zone, calculating a difference between the first bit error rate and the second bit error rate, and determining a value of the current as a warming write current to be supplied to the write head according to the difference, and a write driver which supplies the write head with the warming write current determined by the controller.

According to another aspect of the present invention, an apparatus for controlling a data storage system having a write head includes a temperature sensor which senses a temperature of the data storage system, and a controller measuring a first bit error rate in a predetermined test zone of a medium, measuring a second bit error rate according to a current supplied to the write head in the predetermined test zone, calculating a difference between the first bit error rate and the second bit error rate, and determining a value of the current as a warming write current to be supplied to the write head according to the temperature and the difference.

According to another aspect of the present invention, a medium compatible with a computer performing a method of controlling a warming write current according to a temperature of a writing head includes controlling data used for measuring a first bit error rate in a predetermined test zone of a medium, measuring a second bit error rate according to a current supplied to the write head in the predetermined test zone, calculating a difference between the first bit error rate and the second bit error rate, and determining a value of the current as a warming write current to be supplied to the write head according to the difference, and driving data used for supplying the write head with the warming write current determined by the controller.

According to another aspect of the present invention, a medium compatible with a computer performing a method of controlling a warming write current according to a temperature of a writing head includes temperature reading data used for reading the temperature from the writing head, and controlling data used for measuring a first bit error rate in a predetermined test zone of a medium, measuring a second bit error rate according to a current supplied to the write head in the predetermined test zone, calculating a difference between the first bit error rate and the second bit error rate, and determining a value of the current as a warming write current to be supplied to the write head according to the difference.

BRIEF DESCRIPTION OF THE DRAWINGS

These and/or other aspects and advantages of the invention will become apparent and more readily appreciated from the following description of the preferred embodiments, taken in conjunction with the accompanying drawings of which:

FIGS. 1A through 1C are views of a saturation state of a conventional head pole tip when a writing current is applied to the head pole tip;

FIG. 2 is a view of a dummy write method performed in the conventional head pole tip shown in FIG. 1;

DETAILED DESCRIPTION OF THE PREFERRED EMBODIMENTS

Figure 3:
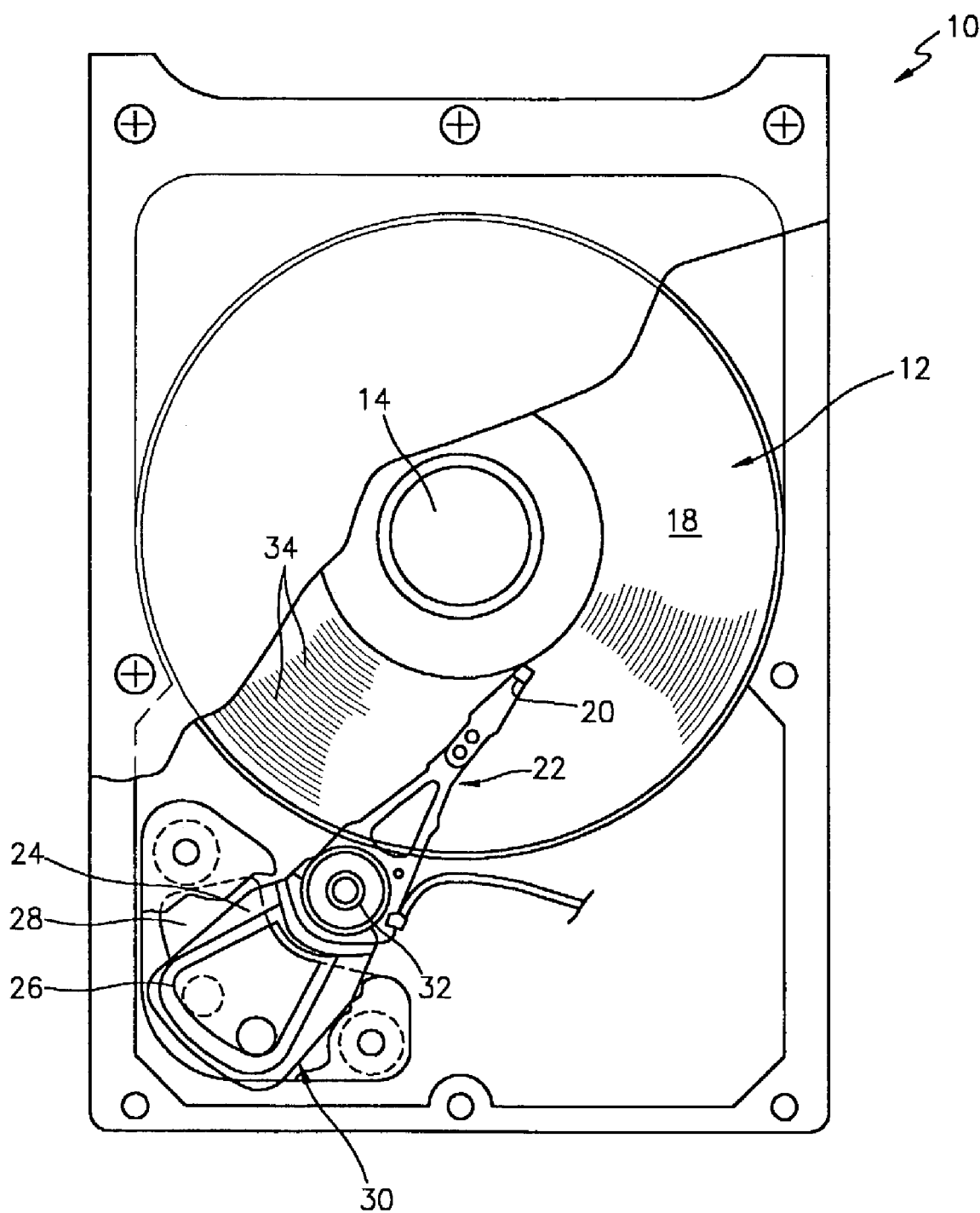
FIG. 3 is a plane view of a structure of a hard disk drive to according to an embodiment of the present invention.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

FIG. 3 shows a structure of a hard disk drive 10 according to an embodiment of the present invention. The hard disk drive 10 includes at least one magnetic disk 12 rotated by a spindle motor 14. The drive 10 also includes a transducer (converter) located adjacent to a disk surface 18 of the disk 12.

The transducer is capable of reading or writing information from or on the rotating disk 12 by detecting and magnetizing the disk 12. Typically, the transducer is coupled to each disk surface 18. Although only a single transducer is presented here, it should be understood that the single transducer is to be formed of a sub-transducer writing by magnetizing the disk 12 and a separate sub-transducer reading the information by detecting a magnetic filed of the disk 12. The transducer reading the information is constructed with a MR (magnetro-resistive) element.

The transducer can be integrated into a head 20. The head 20 is configured to create an air bearing between the transducer and the disk surface 18. The head 20 is coupled to a head stack assembly (HSA) 22. The head stack assembly 22 is attached to an actuator arm 24 having a voice coil 26. The voice coil 26 is located adjacent to a magnetic assembly 28 having a voice coil motor (VCM) 30. When a current is supplied to the voice coil 26, a torque is generated to rotate the actuator arm 24 against a bearing assembly 32. A rotation of the actuator arm 24 moves the transducer across the disk surface 18.

Information is typically stored in a circular track of the disk 12. As shown in FIG. 2, each track 34 generally includes a plurality of sectors. Each sector includes a data sector and a servo sector having a data field and an identification field, respectively. There exists an inter sector gap (ISG) region between the data and servo sectors. The identification field includes a gray code identifying a sector and a track (cylinder). The transducer moves across the disk surface 18 so as to read or write information of another track.

Figure 4:
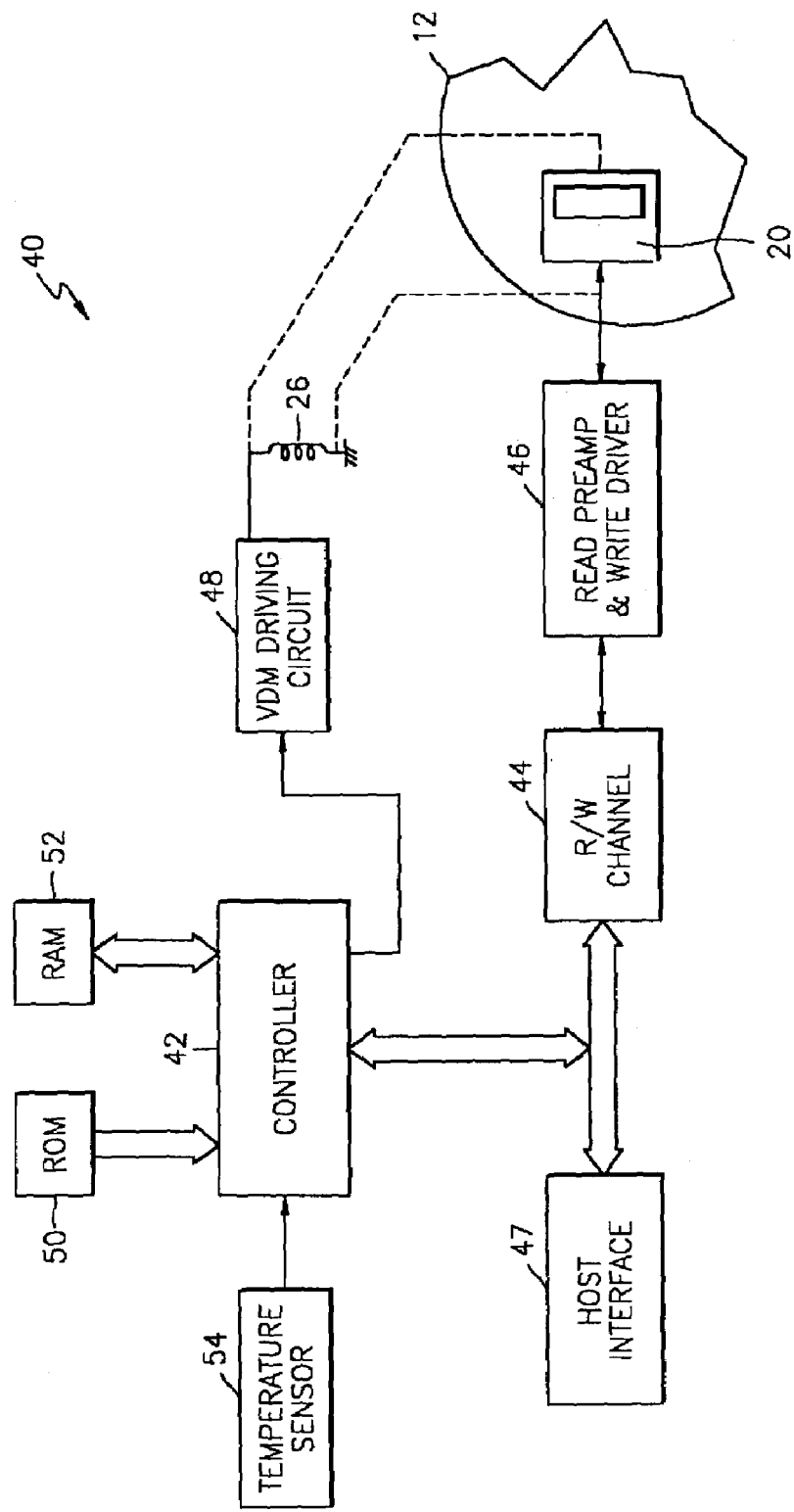
FIG. 4 is a circuit view of an electrical system controlling the hard disk drive shown in FIG. 3.

FIG. 4 shows an electrical system 40. The system 40 includes a controller 42 which is coupled to the head 20 by a read and/or write (R and/or W) channel circuit 44, and a read preamp and write driver circuit 46. A digital signal processor (DSP), a microprocessor, a micro controller, or the like can be used as the controller 42. The controller 42 supplies a control signal to the read and/or write channel 44 so as to read from the disk 12 or write information on the disk 12, and especially controls a warming write current to be enabled at a low temperature. Generally, the information is transmitted to a host interface circuit 47 from the R and/or W channel circuit 44. The host interface circuit 47 includes a buffer memory and a control circuit allowing the disk drive 10 to interface with a system such as a personal computer.

The R and/or W channel circuit 44, in a read mode, modulates an analog signal read by the head 20 and amplified by the read preamp and write driver circuit 46, into a digital signal readable by the host computer to be output to a host interface circuit 47. In addition, the R and/or W channel circuit 44 performs a signal processing to receive user data from the host computer through the host interface circuit 47 and to convert the user data into the writing current to be written on the disk 12, thereby outputting the writing current to the read preamp and write driver circuit 46.

The controller 42 is also coupled to a VCM driving circuit 48 supplying a driving current to the voice coil 26. The controller 42 supplies a control signal to the VCM driving circuit 48 so as to control a movement of the transducer and an excitation of the VCM.

The controller 42 is coupled to a non-volatile memory such as a read only memory (ROM) or a flash memory device 50 and a random access memory (RAM) device 52. The memory devices 50 and 52 include a command and data used by the controller 42 to perform a software routine.

As one of software routines, there are a seek routine moving the transducer from one track to another track and a following routine finding out a target sector within the track. The seek routine includes a servo control routine ensuring to move the transducer to the exact (target) tract.

Figure 5:
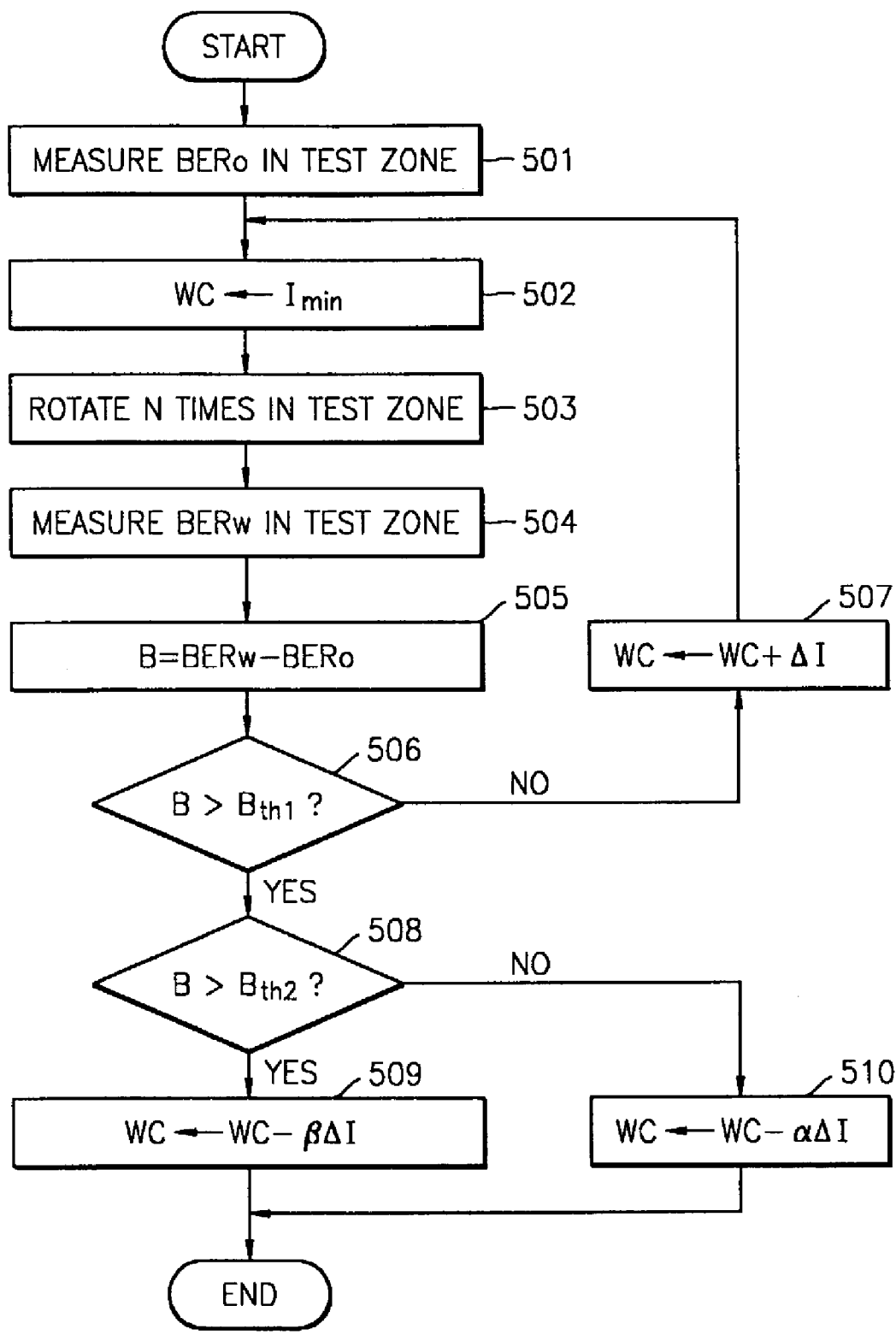
FIG. 5 is a flow chart of a method of determining a warming write current which is applied to a writing head in a data storage system, such as the electrical system controlling the hard disk drive shown in FIGS. 3 and 4, respectively.
Figure 6:
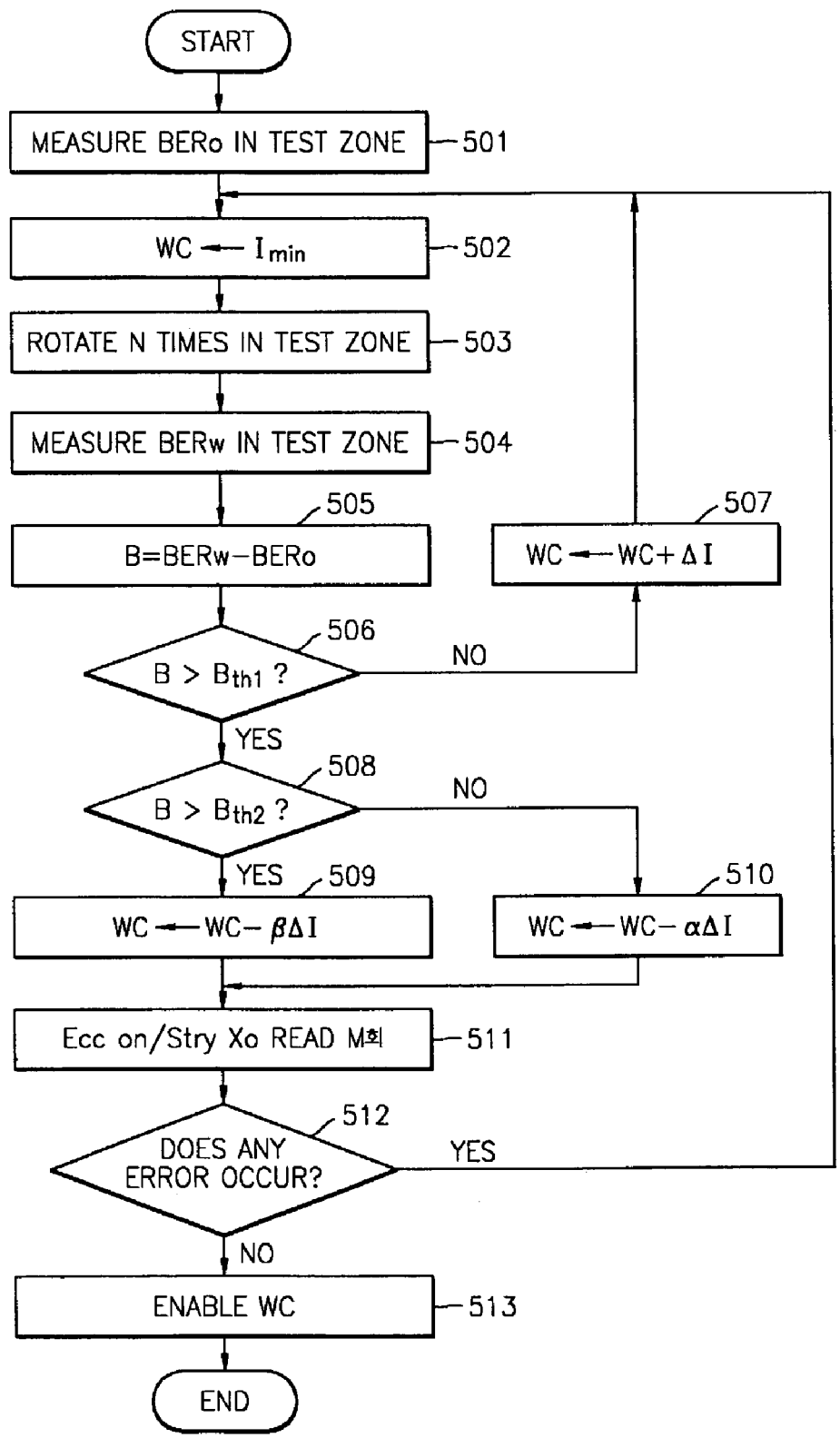
FIG. 6 is a flow chart of a method of determining the warming write current which is applied to the writing head in the data storage system shown in FIGS. 4 and 5.
Figure 7:
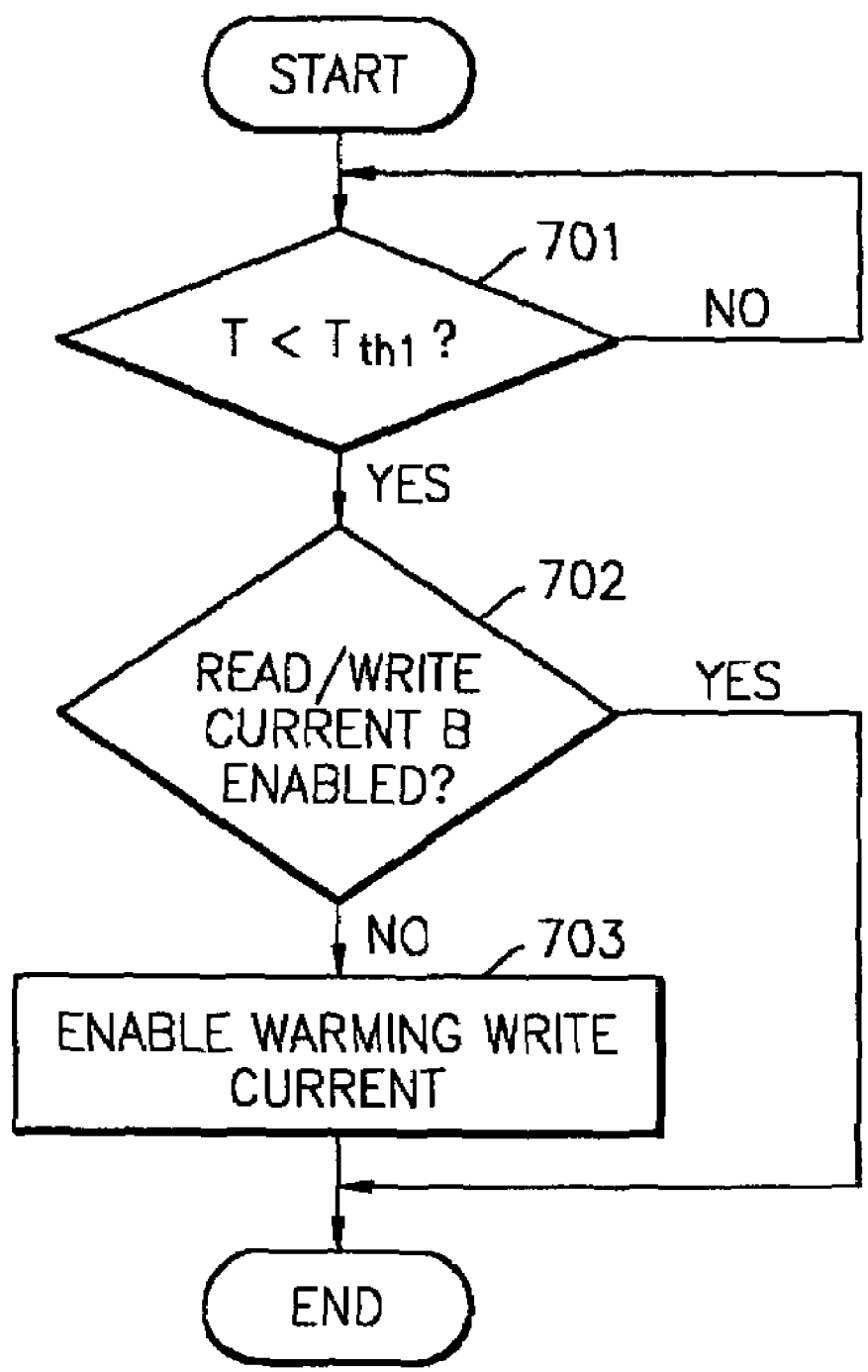
FIG. 7 is a flow chart of a method of controlling the data storage system according to a temperature.

Further, in the memory devices 50 and 52, a program and a value of the warming write current as shown in FIG. 7, are stored. Also, the program according to flow charts as shown in FIGS. 5 and 6, respectively, to determine the value of the warming write current may be stored in the memory devices 50 and 52.

Then, the controller 42 controls the head 20 to enable the warming write current while a read and/or write current is not enabled by a read mode and a write mode in a case that a temperature sensed by a temperature sensor 54 reads below a critical temperature when a power is supplied to the disk drive 10. Here, the critical temperature is determined to be a temperature where a function of initial writing becomes degraded according to a shrinking rate of a head pole tip and a coercive force of a writing medium, such as the disk 12, or the like.

Hereinafter a method of setting the warming write current to be applied to the head pole tip will be described with reference to the flow chart of FIG. 5.

Firstly, a first bit error rate (BERo) is calculated in a certain test zone where a warming write current is not applied (step 501).

After that, the warming write current (WC) applied to the writing head 20 is determined by a minimum warming current (Imin) in the test zone to enable the warming write in operation 502.

Next, the disk 12 is rotated N times when the warming write current is enabled in the test zone in operation 503. For example, N may be 1000.

After the disk 12 is rotated N times when the warming write current is enabled in the test zone, a second bit error rate (BERw) is calculated in operation 504.

Next, a difference B between the second bit error rate (BERw) measured after the warming write current being applied to the head pole tip, and the first bit error rate (BERo) measured before the warming write current being applied to the head pole tip, is calculated in operation 505.

The difference B is then compared with a first critical value (Bth1) in operation 506.

As a result of the operation 506, if the difference B is less than or equal to the first critical value Bth1, it indicates that the second bit error rate does not increase more than a predetermined value by the warming write current, and so after the warming write current (WC) is increased by ΔI, and then, the process is feed back to operation 503 in operation 507. Here, ΔI is determined to the extent that changes of the second bit error rate according to the warming write current can be easily determined.

As a result of the operation 506, if the difference B is greater than the first critical value Bth1, the difference B is compared with a second critical value Bth2 in operation 508. At this time, the second critical value Bth1 is greater than the first critical value Bth1. Here, the first critical value Bth1 and the second critical value Bth2 are determined according to a degree of changes of the first or second bit error rate adjacent to the warming write current where the first or second bit error rate starts changing.

As a result of the comparison in operation 508, if the difference B is less than or equal to the second critical value Bth2, the warming write current WC is determined as a value calculated by subtracting αΔI from the existing current value in operation 510. In this case, the second bit error rate is not sharply changed by an increase of the warming write current near an area where the second bit error rate starts to increase by a predetermined rate by the warming write current, and so a margin of the warming write current can be set relatively small.

Here, α denotes a degree of the margin, for example, if α is set to "1", the warming write current is determined to be a value less by ΔI than the warming current of which the second bit error rate increases more than the first critical value Bth1.

As a result of operation 508, if the difference B is greater than the second critical value Bth2, the warming write current WC is determined as a value calculated by subtracting βΔI from the existing current value in operation 509. In this case, the second bit error rate is sharply changed by an increase of the warming write current near the area where the second bit error rate starts to increase by the predetermined rate by the warming write current, and so the margin of the warming write current should be set relatively large. For example, if β is set to "2", the warming write current is determined to be a value less by 2×ΔI than the warming write current of which the second bit error rate sharply increases greater than the second critical value Bth2.

Through the above operations, the warming write current can be determined as a value subtracting a predetermined margin value when a bit error rate change of the second bit error in the warming write current exceeds a designed allowed value.

Figure 8A:
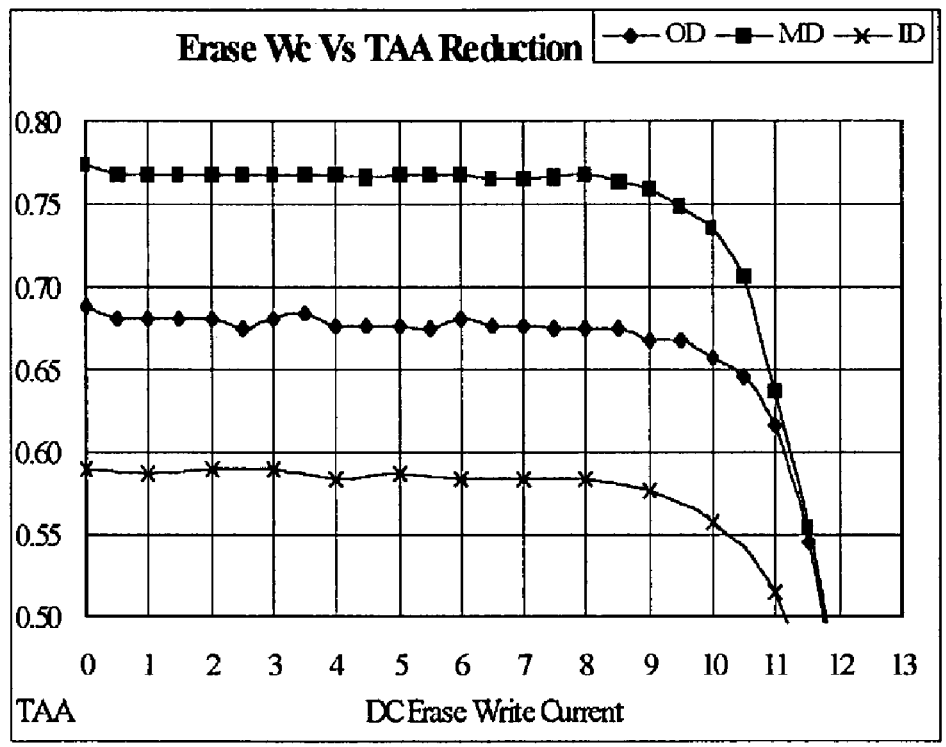
FIGS. 8A and 8B are graphs of reduction characteristics of a written signal according to a magnitude of the warming write current.
Figure 8B:
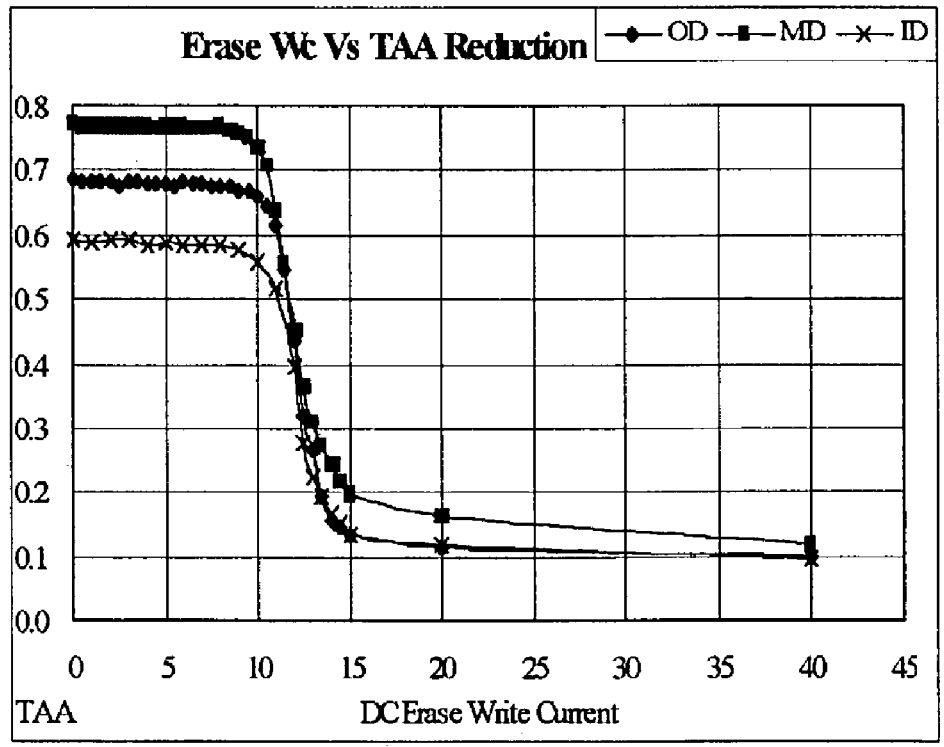

FIG. 8B shows a level reduction magnitude of a recording signal according to the value of the warming write current, and FIG. 8A is an enlarged view of FIG. 8B.

According to FIGS. 8A and 8B, the value of the warming write currents of 0~9 mA rarely affect the recording signal, although the value of the warming write current greater than 10 mA sharply reduces the recording signal. Therefore, it is effective when the warming write current is determined to be below 9 mA.

Next, setting the warming write current will be described with reference to a flow chart of FIG. 6.

Operations 501 through 510 of FIG. 6 are the same as operations 501 through 510 of FIG. 5, and so the descriptions thereof will be omitted.

After the warming write current W is determined according to the bit error change rate of the second bit error rate in operations 509 and 510, an error correction block (ECC) is turned on, and the predetermined number of times (Xo) of retry is set, thereby repeating a reading process at the predetermined times (M) in the test zone in operation 511. For example, Xo can be set to 2 times, and M can be set to 100 times.

Then, if an error in the reading process is determined in operation 512, the method goes back to operation 502 and the above operations are repeated. In this case, it is effective to increase the margin rates of α and β according to the number of repeated reading processes.

If, as a result of the operation 502, no error is identified, the value of the warming write current determined of operations 509 and 510 is finally enabled in operation 513.

Therefore, according to the flow chart of FIG. 6, it is possible to finally determine the warming write current by performing the read process of the value of the warming write current determined according to the second bit error rate shown in the flow chart of FIG. 5 after the error correction block is turned on, and according to determining whether the error has occurred.

A process of applying the warming write current to the write head 20 using the value of the warming write current determined in FIG. 5 and/or 6 will be described mainly with reference to the flow chart of FIG. 7.

Firstly, the controller 42 determines whether a temperature (T) of the hard disk drive 10 detected by the temperature sensor 54 is lower than a critical temperature (Tth) in operation 701. Here, the critical temperature (Tth) is determined to be a temperature at which quality during an initial recording is affected by degradations of a shrink rate of the head pole tip and the coercive force of the recording medium, or the like.

As a result of operation 701, if the temperature (T) detected by the temperature sensor 54 is lower than the critical temperature (Tth), it is determined whether the read and/or write current is enabled by performing a read mode or a write mode in operation 702.

As a result of operation 702, if the read and/or write current is not enabled, the warming write current determined in the flow chart of FIG. 5 or FIG. 6 is enabled and the warming write current is applied to the write/recording head 20 in operation 703.

Through the above process, it is possible to thermally expand the head pole tip of the recording head 20 until the saturation state by performing the warming write with the warming write current to the extent that data already written before performing the write mode is not erased. Accordingly, a problem of quality degradation due to a deterioration of the signal level written in a sector of the initial write mode can be solved.

In order to better analyze the effects of the present invention, Table 1 below presents a first heat capacity generated in a head according to a conventional dummy write method and a second heat capacity generated in the head 20 according to the warming write method of the present invention.

TABLE 1

| | Heat capacity | Writing current | Head resistance | Time | Writing length |
|---|---|---|---|---|---|
| Dummy write | 4.81168E−07 | 0.035(A) | 11 | 0.0001488 | 1.5* 6byte * Avg 1 byte * Avg sectors per track |
| Warming write | 2.37576E−06 | 0.009(A) | 11 | 0.0111100 | 1 rotation |
| Normal write mode | 3.30937E−05 | 0.035(A) | 11 | 0.0102330 | Avg 1 data sectors * Avg sectors per track |

According to Table 1, while the recording current reduces from 35 mA in a normal write mode and, a dummy write to only 9 mA in the warming write, and the heat capacity in a normal recording mode to 100%, the first heat capacity generated in the dummy write method is only 1.45%, while the second heat capacity generated in the warming write method according to the present invention is 7.18% of the same value. Accordingly, it is possible to improve a quality in the initial writing under the low temperature by increasing the second heat capacity generated by the warming write method according to the present invention compared to the conventional dummy write method, so as to sufficiently thermally expand the head pole tip in the initial writing.

As described above, it is possible to prevent occurrences of errors due to a degradation of a signal level written in a sector of the initial writing mode by performing the warming write with the current to the extent that data in a storage system before performing the writing mode is not erased, and by sufficiently thermally expanding the head pole tip of the writing head 20 until a saturation state before writing.

The present invention may be performed as a method, an apparatus, a system, or the like. When performed as software, elements of the present invention are code segments performing necessary processes. The programs or code segments may be stored in a processor readable medium or may be transmitted by a transmitting medium or a computer data signal associated with a carrier in a communication network. The processor readable medium can be an electric circuit, a semiconductor memory device, a ROM (read only memory), a flash memory, an erasable ROM, a floppy disk, an optical disk, a hard disk, an optical fiber medium, a radio frequency network, or the like. The computer data signal includes any signal which can be transmitted over the transmitting medium, such as an electric network channel, an optical fiber, air, an electronic field, a radio frequency network, or the like.

While this invention has been particularly shown and described with reference to preferred embodiments thereof, it will be understood by those skilled in the art that various changes in form and details may be made therein without departing from the spirit and scope of the invention as defined by the appended claims and equivalents thereof.

What is claimed is:

1. A method of controlling a data storage system having a write head, the method comprising:
   detecting a temperature of the data storage system and determining whether the detected temperature is below a critical temperature;

upon determining that the detected temperature is below the critical temperature, determining whether a read and/or write current is enabled; and enabling a predetermined warming write current to be supplied to the write head while the read and/or write current is not enabled.

2. The method of claim 1, wherein the enabling of the predetermined warming write current to be supplied to the write head comprises:

setting a value of the predetermined warming write current as a value so that existing data in the data storage system is not erased.

3. The method of claim 2, wherein the data storage system comprises a medium having a predetermined test zone, and the setting of the value of the predetermined warming write current comprises:

measuring a first bit error rate in the predetermined test zone of the medium;

rotating the predetermined test zone of the medium a predetermined number of times while changing the value of the warming current supplied to the write head;

measuring a second bit error rate according to the value of the warming current of the predetermined test zone;

calculating a difference between the first bit error rate and the second bit error rate; and comparing the difference with a predetermined critical value to determine the value of the warming write current as the warming write current when the difference is below the predetermined critical value.

4. The method of claim 3, wherein the setting of the value of the predetermined warming write current further comprises:

turning on an error correction block;

setting a predetermined number of times to repeat a read process in the predetermined test zone;

determining whether an error has occurred; and determining the value of the warming write current as a second warming write current if the error has not occurred.

5. An apparatus for controlling a data storage system having a write head, the apparatus comprising:

a temperature sensor which senses a temperature of the data storage system;

a controller which enables a predetermined warming write current if the temperature sensed by the temperature sensor is below a predetermined critical temperature; and a write driver which supplies the writing head with the predetermined warming write current.

6. The apparatus of claim 5, wherein the controller enables the predetermined warming write current to be supplied to the writing head while a read and/or write current is not enabled.

7. The apparatus of claim 5, wherein the controller sets the value of the predetermined warming write current as a value so that data already written on a writing medium is not erased.

8. The apparatus of claim 5, wherein the controller measures a first bit error rate in a predetermined test zone, rotates the predetermined test zone a predetermined number of times while changing a value of a warming current applied to a write head, measures a second bit error rate according to the value of the warming current in the predetermined test zone, calculates a difference between the first bit error rate and the second bit error rate, and compares the difference with a predetermined critical value to determine the value of the warming current as a second warming write current when the difference is below the predetermined critical value.

9. The apparatus of claim 8, wherein the controller turns on an error correction block, sets a predetermined number of times to repeat a read process in the predetermined test zone, determines whether an error has occurred, and determines the value of the warming current as the second warming write current if the error has not occurred.

10. A method of setting a warming write current in a data storage system, the method comprising:

measuring a first bit error rate in a predetermined test zone of a medium;

rotating the predetermined test zone a predetermined number of times while changing a value of a warming write current applied to a write head;

measuring a second bit error rate according to the value of the warming current in the predetermined test zone;

calculating a difference between the first bit error rate and the second bit error rate; and comparing the difference with a predetermined critical value to determine the value of the warming current as a warming write current when the difference is below the predetermined critical value.

11. The method of claim 10, wherein the method further comprises:

turning on an error correction block;

setting a predetermined number of time to repeat a read process in the predetermined test zone;

determining whether an error has occurred;

determining the value of the warming write current as a second warming write current if the error has not occurred.

12. An apparatus for controlling a data storage system having a write head, the apparatus comprising:

a controller measuring a first bit error rate in a predetermined test zone of a medium, measuring a second bit error rate according to a current supplied to the write head in the predetermined test zone, calculating a difference between the first bit error rate and the second bit error rate, and determining a value of the current as a warming write current to be supplied to the write head according to the difference; and a write driver which supplies the write head with the warming write current determined by the controller.

13. An apparatus for controlling a data storage system having a write head, the apparatus comprising:

a temperature sensor which senses a temperature of the data storage system; and a controller measuring a first bit error rate in a predetermined test zone of a medium, measuring a second bit error rate according to a current supplied to the write head in the predetermined test zone, calculating a difference between the first bit error rate and the second bit error rate, and determining a value of the current as a warming write current to be supplied to the write head according to the temperature and the difference.

14. The apparatus of claim 13, further comprising:

a write driver which supplies the write head with the warming write current determined by the controller.

15. The apparatus of claim 13, wherein the controller rotates the predetermined test zone with respect to the write head and supplies the current to the write head to detect the second bit error.

16. The apparatus of claim 13, wherein the controller rotates the predetermined test zone with respect to the write head and detects the first bit error without supplying the current.

17. The apparatus of claim 13, wherein the controller compares the temperature with a reference temperature value to generate a comparison value and determines the value of the current as the warming write current to be supplied to the write head according to the comparison value.

18. The apparatus of claim 13, wherein the controller compares the difference with a reference error value to generate a first signal and determines the value of the current as the warming write current to be supplied to the write head according to the first signal.

19. The apparatus of claim 18, wherein the controller compares the difference with a second reference error value, which is greater than the reference error value to generate a second signal and determines the value of the current as the warming write current to be supplied to the write head according to the second signal.

20. The apparatus of claim 13, further comprising:

a memory storing the current.

21. The apparatus of claim 20, wherein the memory stores a plurality of warming currents including the current.

22. The apparatus of claim 13, wherein the medium comprises a sector, which is different from the predetermined test zone, storing data written using a second current before the controller supplies the write head with the warming write current, and the warming write current is different from the second current.

23. The apparatus of claim 22, wherein the controller controls the write head to write data on the sector using the second current after supplying the write head with the warming write current.

24. A medium compatible with a computer performing a method of controlling a warming write current according to a temperature of a writing head, the medium comprising:

controlling data used for measuring a first bit error rate in a predetermined test zone of a medium, measuring a second bit error rate according to a current supplied to the write head in the predetermined test zone, calculating a difference between the first bit error rate and the second bit error rate, and determining a value of the current as a warming write current to be supplied to the write head according to the difference; and driving data used for supplying the write head with the warming write current determined by the controller.

25. A medium compatible with a computer performing a method of controlling a warming write current according to a temperature of a writing head, the medium comprising:

temperature reading data used for reading the temperature from the writing head; and controlling data used for measuring a first bit error rate from a predetermined test zone of another medium, measuring a second bit error rate according to a current supplied to the write head in the predetermined test zone of the another medium, calculating a difference between the first bit error rate and the second bit error rate, and determining a value of the current as a second warming write current to be supplied to the write head according to the difference.

* * * * *

UNITED STATES PATENT AND TRADEMARK OFFICE
CERTIFICATE OF CORRECTION

| | |
|---|---|
| PATENT NO. | : 7,117,399 B2 |
| APPLICATION NO. | : 10/463860 |
| DATED | : October 3, 2006 |
| INVENTOR(S) | : Seung-hyung Song |

It is certified that error appears in the above-identified patent and that said Letters Patent is hereby corrected as shown below:

On the Title page

Item (56) References Cited, U.S. Patent Documents, Col. 2, line 3, change "Rose et al." to --Francis et al.--

Signed and Sealed this

Twentieth Day of March, 2007

JON W. DUDAS
*Director of the United States Patent and Trademark Office*